May 31, 1932.　　　G. JOHNSON　　　1,860,858
SNAP FASTENER SOCKET
Filed Feb. 6, 1931
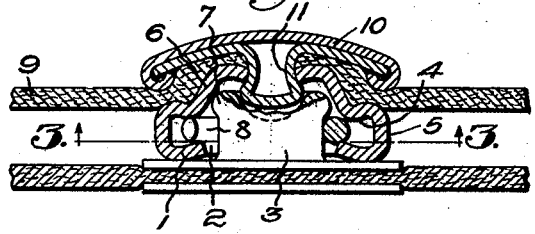
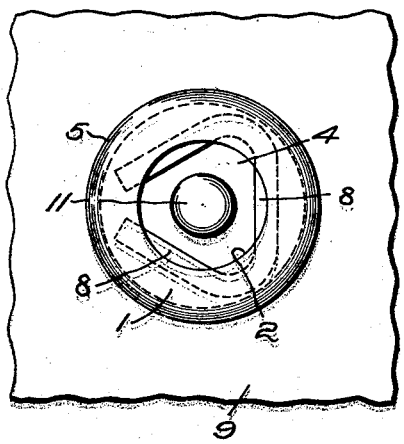 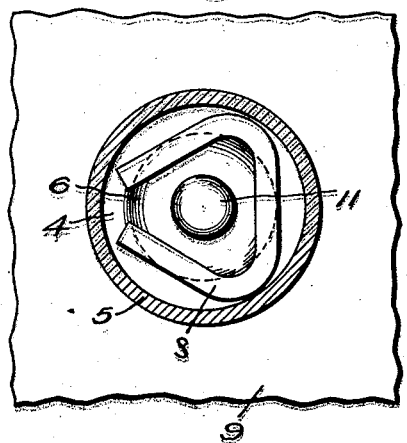
Inventor:
Gustav Johnson
by Emery, Booth, Varney & Townsend
Attys Patented May 31, 1932

1,860,858

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER SOCKET

Application filed February 6, 1931. Serial No. 513,853.

My invention aims to provide improvements in snap fastener sockets.

In the drawings which illustrate a preferred embodiment of my invention:—

Figure 1 is a vertical section through a complete snap fastener installation, the stud being shown partly in elevation;

Fig. 2 is an under side plan view of the socket installation; and

Fig. 3 is a section taken on the line 3—3 of Figure 1, the stud being omitted.

My invention, as illustrated by the annexed drawings, is provided as an improvement over the general type of fastener socket shown in the United States Letters Patent to Fred S. Carr, No. 1,070,113, issued August 12, 1913. It has been found in practice that a socket, of the type shown in the patent referred to above, becomes crushed under some crushing forces which it receives in practice because of the fact that the front face is relatively flat. Many times the fastener socket is rendered useless when crushed because the space between the front and rear faces is reduced beyond the outer periphery of the spring, thereby preventing proper expansion of the spring to permit engagement of a stud with the socket and sometimes the inner diameter of the casing is reduced by such crushing. Furthermore, the spring is sometimes gripped so tightly between the front and rear faces that it cannot function properly.

As a result of my study into the remedies for the difficulties of the type of fastener in question, I have made and operated fastener sockets of a construction shown by the drawings and this fastener socket overcomes the troubles encountered heretofore.

My improved fastener socket comprises a casing formed from a single piece of sheet metal and preferably containing a triangular or polygonal, instead of a circular, type spring. The one piece casing has a front face 1 surrounding a stud-receiving aperture 2 and presenting a surface which slopes toward the opening to guide the stud 3 into engagement with the aperture 2 during engagement of the stud and socket. The sloping face 1 is preferably provided by making the face arch-shaped in radial cross-section, as best illustrated in Figure 1. The casing also has a back face portion 4 which is spaced from the front face portion 1 and is connected therewith by the substantially perpendicular wall 5. The central portion of the back face portion 4 is pressed out to form a dome 6 to provide room for the head 7 of the stud 3 when engaged with the socket. In the particular fastener illustrated the dome 6 is frusto-conical in shape to increase the strength of the casing.

The spring 8 is made triangular in shape so that the three sides will intersect the stud-receiving aperture (Fig. 2) for engagement with the neck of the stud and also to permit the use of a front face sufficiently wide to provide a substantial arch-shaped portion. The combination of the arched front face 1 and the domed rear face 4 together with the perpendicular wall 5 forms a casing which is of very rigid construction and ordinary crushing forces applied to the socket in use will not destroy the casing to an extent which will impair the operation of the spring 8.

The socket may be attached in any suitable manner and I have shown one example of an attachment whereby it is attached to a flexible carrying medium 9 by a tack or rivet 10 having a shank 11 passing through an aperture in the dome 6 and having its end upset therein, as shown in Figs. 1 and 2.

While I have illustrated and described a preferred embodiment of my invention, I do not wish to be limited thereby, because the scope of my invention is best defined by the following claims.

Claims:

1. A snap fastener socket comprising, in combination, a casing and a spring contained in said casing, said casing having a front wall of greater width than the thickness of the material of the spring and surrounding a stud-receiving aperture, a substantially straight peripheral wall substantially parallel with the axis of the socket, and said front wall being arched in cross-section from its connection with the peripheral wall to the stud-receiving aperture whereby said front wall and said peripheral wall combine to prevent crushing of said casing and thereby permit free operation of the spring at all times.

2. A snap fastener socket comprising, in combination, a sheet metal casing having a front wall apertured to permit passage of the shank of a cooperating stud, a back wall spaced from said front wall, a peripheral wall connecting said front and back walls and a spring held between the walls of said casing and having substantially straight portions intersecting the stud-receiving aperture and said front wall being arched in cross-section from its connection with the peripheral wall to the stud-receiving aperture to prevent crushing of the casing and gripping of the spring between the front and back walls.

3. A snap fastener socket comprising a casing and a spring contained in said casing, said casing being formed from a single piece of sheet metal and having an imperforate front wall of greater width than the thickness of the material of the spring and surrounding a stud-receiving aperture and being sloped from the outer portion toward the stud-receiving aperture to guide a stud into said aperture.

4. A snap fastener socket comprising, in combination, a casing and a multi-sided spring contained in said casing, said casing having a front wall arched in cross-section, said front wall being of greater width than the thickness of the material of the spring and surrounding a stud-receiving aperture, said front wall, because of its arched cross-section, cooperating with the remainder of said casing to prevent crushing thereof and thereby permit free operation of said spring at all times.

5. A snap fastener socket comprising, in combination, a sheet metal casing having a front wall 1, means providing a stud-receiving aperture 2 through said front wall, a back wall 4 spaced from the front wall and connected by a peripheral wall 5, a dome 6 extending from said back wall 4 and a multi-sided spring 8 contained in said casing and having straight sides thereof intersecting the stud-receiving aperture 2, said front wall being arched in cross-section and being of greater width than the thickness of the material of the spring 8 and cooperating with the peripheral wall 5, the back wall 4 and the dome 6 to prevent crushing of the casing when subjected to abnormal pressure, thereby permitting free operation of the spring at all times.

In testimony whereof, I have signed my name to this specification.

GUSTAV JOHNSON.